US011609321B2

(12) United States Patent
Bongio Karrman et al.

(10) Patent No.: US 11,609,321 B2
(45) Date of Patent: Mar. 21, 2023

(54) RADAR-TRACKED OBJECT VELOCITY AND/OR YAW

(71) Applicant: Zoox, Inc., Foster City, CA (US)

(72) Inventors: Anton Mario Bongio Karrman, Foster City, CA (US); Michael Carsten Bosse, Cupertino, CA (US); Subhasis Das, Menlo Park, CA (US); Francesco Papi, Sunnyvale, CA (US); Jifei Qian, Campbell, CA (US); Shiwei Sheng, Cupertino, CA (US); Chuang Wang, Sunnyvale, CA (US)

(73) Assignee: Zoox, Inc., Foster, CA (US)

( * ) Notice: Subject to any disclaimer, the term of this patent is extended or adjusted under 35 U.S.C. 154(b) by 389 days.

(21) Appl. No.: 16/795,411

(22) Filed: Feb. 19, 2020

(65) Prior Publication Data
US 2021/0255307 A1    Aug. 19, 2021

(51) Int. Cl.
G01S 13/72      (2006.01)
G01S 13/931     (2020.01)
G05D 1/02       (2020.01)

(52) U.S. Cl.
CPC .......... G01S 13/723 (2013.01); G01S 13/931 (2013.01); G01S 2013/9321 (2013.01); G05D 1/0257 (2013.01)

(58) Field of Classification Search
CPC ................ G01S 13/723; G01S 13/931; G01S 2013/9321; G01S 13/582; G01S 13/589; G01S 13/726; G05D 1/0257
USPC ..... 701/23, 41; 340/10.1, 10.3, 505; 342/70, 342/71
See application file for complete search history.

(56) References Cited

U.S. PATENT DOCUMENTS

| | | | |
|---|---|---|---|
| 2016/0223661 A1* | 8/2016 | Song | G01S 13/86 |
| 2017/0097410 A1* | 4/2017 | Liu | G01S 13/723 |
| 2018/0350391 A1 | 12/2018 | Moore et al. | |
| 2018/0356517 A1* | 12/2018 | Cieslar | G01S 13/42 |
| 2019/0180451 A1* | 6/2019 | Kellner | G06T 7/285 |
| 2019/0220014 A1* | 7/2019 | Bradley | G01S 13/931 |

(Continued)

FOREIGN PATENT DOCUMENTS

| | | |
|---|---|---|
| WO | WO2018156451 A1 | 8/2018 |
| WO | WO2019236790 A1 | 12/2019 |

OTHER PUBLICATIONS

Sigonius, Marc. "Speed and yaw rate estimation in autonomous vehicles using Doppler radar measurements." (2018). Retrieved from http://urn.kb.se/resolve?urn=urn:nbn:se:kth:diva-240369 (Year: 2018).*

(Continued)

*Primary Examiner* — Gertrude Arthur Jeanglaude
*Assistant Examiner* — Ellis B. Ramirez
(74) *Attorney, Agent, or Firm* — Lee & Hayes, P.C.

(57) ABSTRACT

Some radar sensors may provide a Doppler measurement indicating a relative velocity of an object to a velocity of the radar sensor. Techniques for determining a two-or-more-dimensional velocity from one or more radar measurements associated with an object may comprise determining a data structure that comprises a yaw assumption and a set of weights to tune the influence of the yaw assumption. Determining the two-or-more-dimensional velocity may further comprise using the data structure as part of regression algorithm to determine a velocity and/or yaw rate associated with the object.

20 Claims, 5 Drawing Sheets

(56) References Cited

U.S. PATENT DOCUMENTS

| | | | | |
|---|---|---|---|---|
| 2019/0369222 A1* | 12/2019 | Oh | .......................... | G05D 1/101 |
| 2019/0369228 A1* | 12/2019 | Stachnik | ................ | G01S 13/931 |
| 2020/0057090 A1* | 2/2020 | Stachnik | ................. | G06F 17/16 |
| 2020/0301435 A1* | 9/2020 | Phillips | .............. | G01C 21/3453 |
| 2020/0371228 A1* | 11/2020 | Wang | ..................... | G06V 20/56 |

OTHER PUBLICATIONS

PCT Search Report and Written Opinion dated May 27, 2021, PCT Application No. PCT/US2021/018820, 10 pages.

\* cited by examiner

RADAR-TRACKED OBJECT VELOCITY AND/OR YAW

BACKGROUND

An autonomous vehicle may use a radar sensor to capture data regarding an environment through which the autonomous vehicle traverses and use this data to detect objects in the environment to avoid collisions. Some radar sensors may provide a Doppler measurement indicating a relative velocity of an object to a velocity of the radar sensor. However, Doppler measurements only provide a velocity of an object relative to the radar sensor. In other words, the Doppler measurements are one-dimensional velocity and do not specify a yaw rate of the object, which may be necessary for safe operation in some environments, such as for use in autonomous vehicles.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
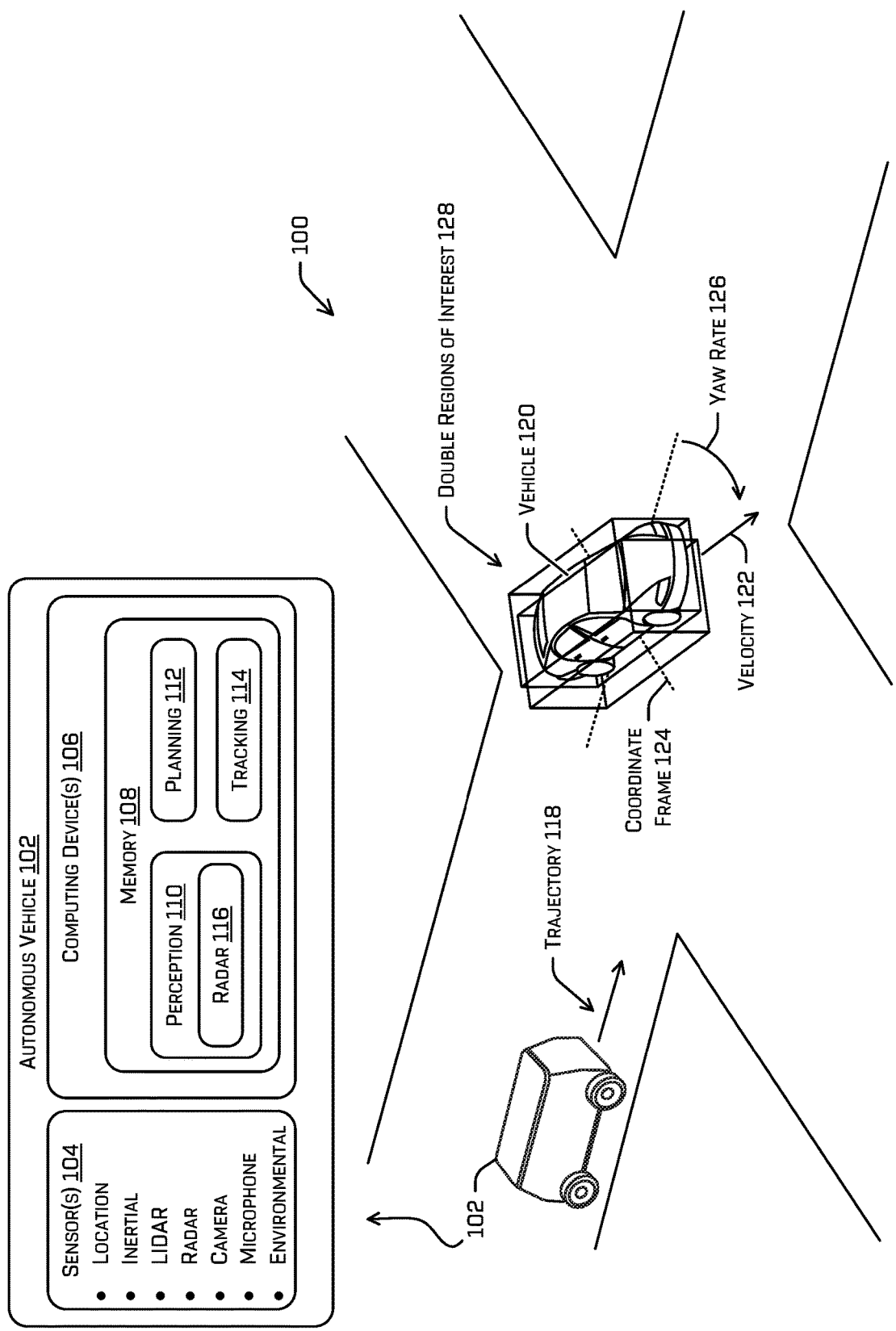
FIG. 1 illustrates an example scenario in which an autonomous vehicle configured with perception and tracking components may track an object's previous and current positions, velocities, and/or headings in an environment surround the autonomous vehicle and generate a trajectory for controlling the autonomous vehicle based at least in part on the track.

Techniques described herein are directed to characterizing movement of objects in in an environment based on radar data. For example, the techniques may comprise determining one or more radar returns that are associated with an object in an environment of the radar sensor, and determining a two (or more)-dimensional velocity and/or a yaw rate for the object based at least in part on the returns. Although many systems may benefit from the techniques described herein, an example system that implements the techniques of this disclosure may include an autonomous vehicle having one or more radar sensors (and/or sensors of other or different modalities). The techniques may additionally or alternatively include determining a track associated with the object. The track may include the velocity determined according the techniques discussed herein and/or a historical, current, and/or predicted velocity, position, yaw rate, orientation, acceleration, and/or the like. In some examples, a track may identify that an object detected in former sensor data is the same object detected in current sensor data.

The techniques may comprise receiving radar data associated with an environment, detecting an object in the environment based at least in part on the radar data and/or data from one or more other sensors, and identifying a subset of the radar data that is associated with the object. This subset of radar data may be used to determine a velocity associated with the object. For example, U.S. patent application Ser. No. 16/386,249, filed Apr. 16, 2019 and U.S. patent application Ser. No. 16/587,605, filed Sep. 30, 2019, both discuss detecting an object based at least in part on radar data and are incorporated in their entirety herein. In the discussion that follows, the velocity determined by the techniques may comprise a two or three-dimensional velocity and/or a rotational velocity, such as a yaw rate, unless otherwise specifically specified. In such examples, the velocity may comprise, additionally or alternatively, one or more of a linear velocity and a rotational velocity.

In a first implementation of the techniques, determining the yaw rate and/or velocity may comprise receiving a subset of radar data associated with an object and determining whether a holonomic solution exists for a rigid body estimation based on the subset of radar data. For example, the rigid body estimation may comprise holonomic constraints chosen to reflect physical restraints, such as an assumption that an object, such as a vehicle, will not slide laterally. A holonomic solution may be a two-dimensional velocity and a yaw rate that solves the rigid body estimation, using a linear, Cauchy, and/or re-weighted regression, while satisfying the holonomic (physical) constraints. In some examples, before determining the velocity and/or yaw rate, the technique may comprise removing outliers, e.g., using a random sample consensus (RANSAC) algorithm.

If no holonomic solution exists (e.g., no solution exists that meets the physical constraints), the first implementation may comprise determining whether a subset of radar data satisfies each rule of a set of rules, where the set of rules are a more complex physical constraint check. If all of the rules are satisfied, the first implementation may comprise determining a two-dimensional velocity associated with the object, but may be unable to determine a yaw rate. If any of the rules are not satisfied, the first implementation may comprise determining a one-dimensional velocity of the object based at least in part on the Doppler measurements indicated by the subset of radar data. The yaw rate may not be available in such an instance, which may be problematic for tracking an object, providing predictions of future locations of the object, or the like.

In other words, according to the first implementation, the techniques may comprise attempting a rigid body estimation using a subset of radar points to obtain a solution comprising a velocity and a yaw rate. However, there may not be a solution to the rigid body estimation since it may comprise a multivariate regression that does not converge or that violates the holonomic constraints put on solutions. When a solution isn't tractable, the first implementation may comprise checking to determine whether a set of constraints is met and, if so, determining a velocity based on a dual velocity determination where a first determination is based on the Doppler value associated with a radar point and the second determination is based on an assumption that the velocity is in a yaw direction. If any one of the constraints is not met, the first implementation may be relegated to relying on a range rate (i.e., Doppler) associated with an object.

In an additional or alternate embodiment, the techniques for determining the yaw rate and/or velocity associated with an object may comprise receiving a set of radar data associated with an object, rejecting outliers to of the set using a random sample consensus (RANSAC) technique to determine a subset of radar points, and generating two different data structures based at least in part on the subset of radar data. The first data structure may comprise a yaw rate assumption, whereas the second data structure may lack the yaw rate assumption. Both data structures may be used as observed variables in part of a regression algorithm for determining a two (or more)-dimensional velocity and yaw rate associated with the object. In some examples, the techniques may comprise determining a first error may in association with the first data structure and determining a second error in association with the second data structure. Whichever data structure result in a yaw rate and/or velocity associated with the lower error of the two errors may be output by the system in association with the object.

For example, the techniques may comprise populating a first data structure with the subset of radar data and a yaw rate assumption that is based at least in part on a track associated with the object—the track may indicate a previous, current, and/or predicted position; velocity; heading, which may comprise a yaw; acceleration; and/or yaw rate of the object. The techniques may also comprise populating a second data structure with the subset of radar data but may exclude the yaw rate assumption. The techniques may comprise determining a first yaw rate and first velocity based at least in part on solving a linear regression using the first data structure and determining a second yaw rate and second velocity based at least in part on solving a linear regression using the second data structure. A first error may be determined in association with the first data structure and a second error may be determined in association with the second data structure. The techniques may comprise selecting the yaw rate and/or velocity associated with the whichever error is lower between the first error and the second error.

In some examples, the techniques may additionally or alternatively comprise fusing the first and second data structure into a single data structure that includes the yaw assumption and determining the velocity and/or yaw rate based at least in part on a weighted regression. The weighted regression may functionally turn the influence of the yaw rate assumption up or down and may turn the yaw assumption off. The weighted regression may also serve to reject or down-weight the influence of outliers, so the outlier rejection preprocessing operation (e.g., applying RANSAC to a subset of radar data associated with an object) may be discarded in some examples.

In some examples, the techniques may additionally or alternatively comprise determining one or more covariances associated with the data structure that was selected and determining the yaw rate and/or velocity may comprise providing the selected data structure and one or more covariances to a Kalman filter. The Kalman filter may additionally or alternatively receive a track as input and may update a state associated with an object indicated by the track. In an example where the first data structure comprising the yaw assumption was selected, the covariance(s) may be used to weight the yaw assumption.

The techniques discussed herein may improve the safety of a vehicle by improving the vehicle's ability to predict movement and/or behavior of objects in the vehicle's surroundings. The techniques may increase the accuracy and/or availability of two-or-more dimensional velocity detection based on radar data. For example, the techniques discussed herein are less likely or do not result in the two object detection artifact caused by former techniques when a detected object is turning. Moreover, the techniques discussed herein remove the need for hand-tuned physical constraint rules, reducing or eliminating the need to experiment with the system during setup, increasing the ease of troubleshooting the system, and decreasing the number of outlier scenarios that degrade accuracy of the system and aren't adequately reflected by hand-tuned physical constraint rules.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, and/or tracking component 114. In some examples, the perception component 110 may comprise a radar component 116 configured to determine a yaw rate and/or velocity of an object based at least in part on radar data. The perception component 110, the planning component 112, the tracking component 114, and/or the radar component 116 may include one or more machine-learned (ML) models and/or other computer-executable instructions.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like. The trajectory 118 may comprise instructions for controller(s) of the autonomous vehicle 102 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) to track. In some examples, the controller(s) may comprise software and/or hardware for actuating drive components of the vehicle 102 sufficient to track the trajectory 118. For example, the controller(s) may comprise one or more proportional-integral-derivative (PID) controllers.

In some examples, the perception component 110 may receive sensor data from the sensor(s) 104 and determine data related to objects in the vicinity of the vehicle 102 (e.g., object classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

In some examples, one or more components of the perception component 110 may determine a subset of the radar data associated with an object, such as vehicle 120 in the example scenario 100. Regardless, the radar component 116 may receive at least a subset of radar data associated with an object and may determine a two (or more)-dimensional velocity associated with the object according to the techniques discussed herein. For example, the velocity 122 may be a velocity having at least two components, such as a lateral component, a longitudinal component, and/or a yaw component relative to a coordinate frame 124. The coordinate frame may be a coordinate system oriented based on the environment, a roadway or path, an inertial direction of movement associated with the autonomous vehicle 102, and/or the like. The depicted coordinate frame 124 may be relative to a pose of the autonomous vehicle.

In some examples, the velocity determined by the techniques discussed herein may be provided to a prediction component of the perception component 110 and/or planning component 112. The prediction component may use the velocity to predict a future state of a detected object based at least in part on the velocity, such as a predicted trajectory (e.g., predicted heading, predicted velocity, predicted path). In an additional or alternate example, the velocity may be provided to the planning component 112 for the planning component 112 to determine a trajectory 118 for controlling the autonomous vehicle 102. The planning component 112 may determine the trajectory 118 based at least in part on the predicted trajectory and/or the velocity determined by the radar component 116.

In some examples, the radar component 116 may additionally or alternately estimate a center of the detected object and/or a dimensions and/or size of the detected object based at least in part on a subset of radar data associated with the object.

The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data, which may comprise the velocity 122 and/or yaw rate 126 determined according to the techniques discussed herein. Once the perception component 110 has generated perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar).

FIG. 1 also depicts an example of an error caused by former techniques. The first implementation discussed above may result in two regions of interest, indicated as "double regions of interest 128" in FIG. 1, being assigned to an object. This issue may be more likely to arise when the detected vehicle is turning or otherwise rotating on a yaw axis.

The tracking component 114 may receive sensor data and/or object detections from the sensor(s) and/or perception component 110 and may determine whether or not to associate a formerly-generated track with a current object detection or to generate a new track in association with a current object detection. In other words, the tracking component 114 identifies whether a recently detected object has been previously detected or not and tracks information associated with detected objects. The tracking component 114 may output a track associated with a detected object that identifies a historical, current, and/or predicted position, heading, velocity, acceleration, yaw rate, perception data (e.g., a region of interest, an occlusion status, such as a whether all or part of the object is/was hidden from one or more sensors) and/or the like associated with the object. In some examples, track information may be included as part of the perception data output by the perception component 110.

In some examples, the track may additionally or alternatively comprise various current and/or previous data about the object useful for a planning component of an autonomous vehicle to predict motion/behavior of the object and to determine a trajectory and/or path for controlling the autonomous vehicle. For example, the track may additionally or alternatively comprise an indication of region(s) of the environment currently and/or previously occupied by the object, an object classification associated with the object (e.g., a vehicle, an oversized vehicle, a pedestrian, a cyclist), a current/or previous heading associated with the object, a current and/or previous velocity and/or acceleration of the object, and/or a current position and/or velocity of the object. For example, the track may associate regions of interest (ROIs) (e.g., a bounding box, a mask, some other identification that a region of the environment is occupied by an object) generated by the perception component with a same track. An ROI may be associated with a detected object, an object classification of the object, a heading of the object, a velocity and/or acceleration of the object, a height of the object, and/or the like.

The planning component 112 may use the perception data received from perception component 110 and/or tracking component 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s), which may, in turn, actuate a drive system of the vehicle 102.

Example System

Figure 2:
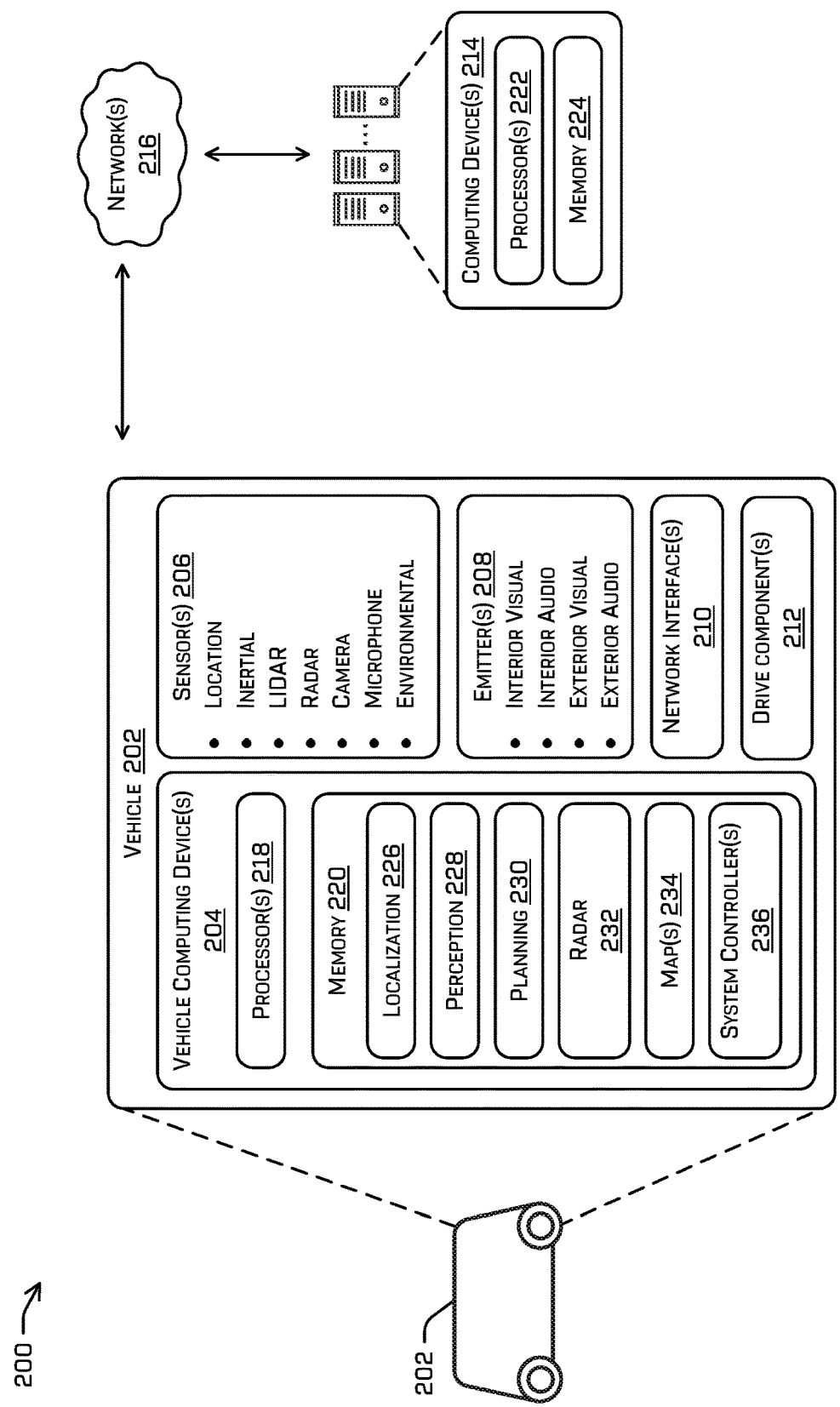
FIG. 2 illustrates a block diagram of an example architecture of a system for determining a two-or-more-dimensional velocity from radar data associated with an object.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, radar component 232, map(s) 234, and/or system controller(s) 236. Perception component 228 may represent perception component 110 and may comprise tracking component 114, planning component 230 may represent planning component 112, and/or radar component 232 may represent radar component 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The radar component 232 may operate on the vehicle 202 and/or on the computing device(s) 214. In some examples, the radar component 232 may be upstream (provide input to) from the planning component 230 in a pipeline and downstream (receive input) from at least some components of the perception component 228. The radar component 232 may be configured to pass all, part, or none of the output of the radar component 232 to a tracking component and/or the planning component 230. In some examples, the radar component 232 may be part of the perception component 228. In some examples, the radar component 232 may determine a velocity and/or yaw rate according to the techniques discussed herein.

The memory 220 and/or 224 may additionally or alternatively store a mapping system (e.g., generating a map based at least in part on sensor data), a planning system, a ride management system, etc. Although localization component 226, perception component 228, planning component 230, radar component 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the radar component 232, and/or other components of the system 200 may comprise one or more ML models. For example, the localization component 226, the perception component 228, the planning component 230, and/or the radar component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate and the perception data/or transmit the instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
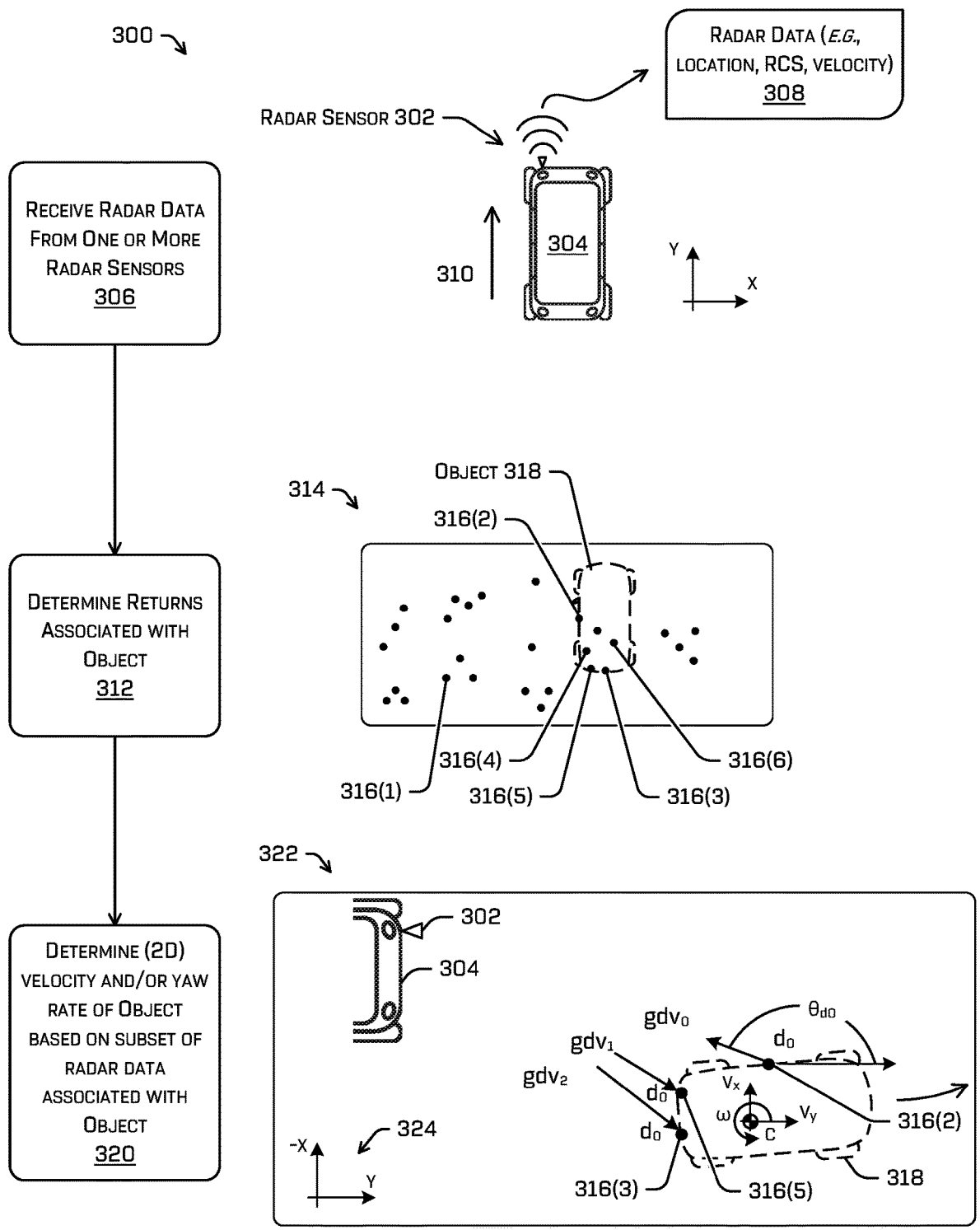
FIG. 3 illustrates a pictorial flow diagram of an example process for determining returns associated with an object and determining a two-or-more-dimensional velocity and/or yaw rate from radar data associated with the object.

FIG. 3 illustrates a pictorial flow diagram of an example process 300 for determining a two-or-more-dimensional velocity from radar data associated with an object based at least in part on a subset of radar data associated with the object. In examples described herein, the radar data may be obtained by one or more radar sensors, such as the radar sensor 302, disposed on a vehicle 304. In some implementations, the operations of example process 300 may be accomplished by one or more components of a perception component of an autonomous, semi-autonomous, or non-autonomous vehicle, such as a radar component of the perception component.

At operation 306, example process 300 may comprise receiving radar data 308 from one or more radar sensors, according to any of the techniques discussed herein. In the illustrated example, the vehicle 304 may be traversing through the environment generally in a direction indicated by an arrow 310 (although in other implementations, the vehicle 304 may be stationary or moving in a different direction), such that the radar sensor 302 is disposed on the leading end of the vehicle 304, e.g., to capture data about objects in front of the vehicle 304. More specifically, the radar sensor 302 may capture radar data 308, e.g., via one or more radar scans.

In some example implementations, the radar data 308 may include position information indicative of a location of objects in the environment, e.g., a range and azimuth relative to the vehicle 304 and/or a position in a local or global coordinate system. The radar data 308 may also include signal strength information. For example, the signal strength information may be an indication of a type or composition of the surface from which the radio waves are reflected. In some instances, the signal strength may be a radar cross-section (RCS) measurement. The radar data 308 may also include velocity information, such as a range rate determined from a Doppler measurement. For instance, velocity of the object may be based on a frequency of radio energy reflected by the object and/or a time at which the reflected radio energy is detected. The radar data 308 may additionally or alternatively also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, and/or the like.

At operation 312, example process 300 may comprise determining returns associated with an object based at least in part on the radar data, according to any of the techniques discussed herein. The illustration comprises a visualization 314 of radar data 316. More specifically, the visualization 314 includes a plurality of representations of radar points illustrated as circular points, which may be representative of returns caused by objects, surfaces, or other reflective items, in an environment of the vehicle 304. As illustrated, some circular points are labelled with reference numerals 316(1), 316(2), 316(3), 316(4), 316(5), 316(6). In the example, each of the points depicted as part of the visualization 314 may correspond to a position of a surface that reflected a radio wave emitted by the radar device and was detected at the radar sensor 302. As will be appreciated, the radar sensor 302 may receive and/or generate several types of information about the environment, so the visualization 314 could include more or less information; the visualization 314 is merely for explanatory purposes.

The visualization 314 illustrates that some of the points appear to be close in location, and as such, may be associated with a single object. For example, the points 316(2)-316(6) are closely situated, e.g., within a threshold distance, and in some instances those points may be estimated to be indicative of a single object, such as an object 318. For example, a data association component, as discussed in more detail in U.S. patent application Ser. No. 16/416,686, the entirety of which is incorporated herein by reference, may determine that the points 316(2)-316(6) could be identified as a point cluster representative of an object 318 in the environment surrounding the vehicle 304. In examples described herein, and as discussed above, a point cluster may include a plurality of points that have some likelihood, e.g., a level and/or degree of similarity, to identify a single object or grouping of objects that should be considered together, e.g., by a planning system of an autonomous vehicle. In aspects of this disclosure, information in addition to position information may be used to determine the point cluster. Moreover, the data association component may consider historical information, e.g., track information for the vehicle 304 and/or the object 318 to properly associate the radar returns with the object 318.

Accordingly, in implementations of this disclosure, the operation 312 may determine returns representative of the object 318, e.g., because the points may be clustered based on one or more diverse types of information, and because sensor data from multiple scans and/or radar sensors is used to create the cluster. Operation 312 may result in determining a subset of radar data associated with the object 318 from among the radar data from one or more scans.

In some examples, operation 312 may further comprise executing a RANSAC algorithm to reject outliers in the radar data and/or subset of the radar data. By way of non-limiting example, RANSAC methods may reject returns that were identified as being part of the subset of the radar data associated with the object 318, but that are not actually from the object 318. For instance, the RANSAC methods can reject returns from the ground proximate the object 318. Of course, this disclosure is not limited to using RANSAC for outlier rejection. Other techniques, including but not limited to iterative least squares, can alternatively be used. In some examples, a RANSAC operation may be based at least in part on an assumption about motion of the detected object, such as a rigid body model, although this may be assumption may be altered based at least in part on a classification of the object detected (e.g., based at least in part on other perception data, such as a classification determined based at least in part on image and/or lidar data).

At operation 320, example process 300 may comprise determining a two-(or more) dimensional velocity and/or a yaw rate of the detected object based at least in part on a subset of radar data associated with the object, according to any of the techniques discussed herein. The visualization 322 includes the vehicle 304 (with the radar sensor 302) and three of the points 316(2), 316(3), and 316(5) associated with the object 318. The visualization 322 also illustrates a coordinate system 324, which may be oriented based at least in part on a pose of the vehicle 304 in the depicted example.

In the visualization 322, for clarity of representation, the point 316(2) is represented as a first detected point $d_0$, the point 316(5) is represented as a second detected point $d_1$, and the point 316(3) is represented as a third detected point $d_2$. Although only the three detected points from the radar data 308 are illustrated in the example depiction, the techniques described herein can use any and all returns associated with the object 318. As illustrated, the object 318 may have a center of rotation, c, and movement of the object 318 may be characterized by a velocity in the x-direction, e.g., a velocity $v_x$, a velocity in the y-direction, e.g., a velocity $v_y$, (at least in a Cartesian coordinate system, although other coordinate systems may be used) and a yaw rate ω about the center of rotation, c. In examples, the center of rotation, c, may be selected arbitrarily, although in additional or alternate examples, the center of rotation may be determined by the radar component and/or another perception component, and/or may be included as part of a track associated with the object 318.

In the illustrated example, the position of the detected points $d_0$-$d_2$, the position of the radar sensor 302 (which generated the return associated with the first point $d_0$) and the position of the center of rotation, c, all are known or have at least been estimated by a perception component. Moreover, each of the first detected point $d_0$, the second detected point $d_1$, and the third detected point $d_2$ has an associated observed velocity, $\theta_i$, e.g., a Doppler velocity. Such velocities are illustrated in the example as $gdv_0$, $gdv_1$, and $gdv_2$, respectively. Note that gdv represents "ground Doppler velocity." Such velocities are velocities along the direction between the point and the sensor sensing the velocity. For example, $gdv_0$ is a velocity along a direction ($\vec{rd_0}$) from the first detected point $d_0$ to the radar sensor 302, $gdv_1$ is a velocity along a direction ($\vec{rd_1}$) from the second detected point $d_1$ to the radar sensor 302, and $gdv_2$ is a velocity along a direction ($\vec{rd_2}$) from the third detected point $d_2$ to the radar sensor 302. As will be appreciated, the directions of the velocities $gdv_0$, $gdv_1$, and $gdv_2$ indicate that the object 318 is moving counter-clockwise about the center of rotation, c.

Figure 4:
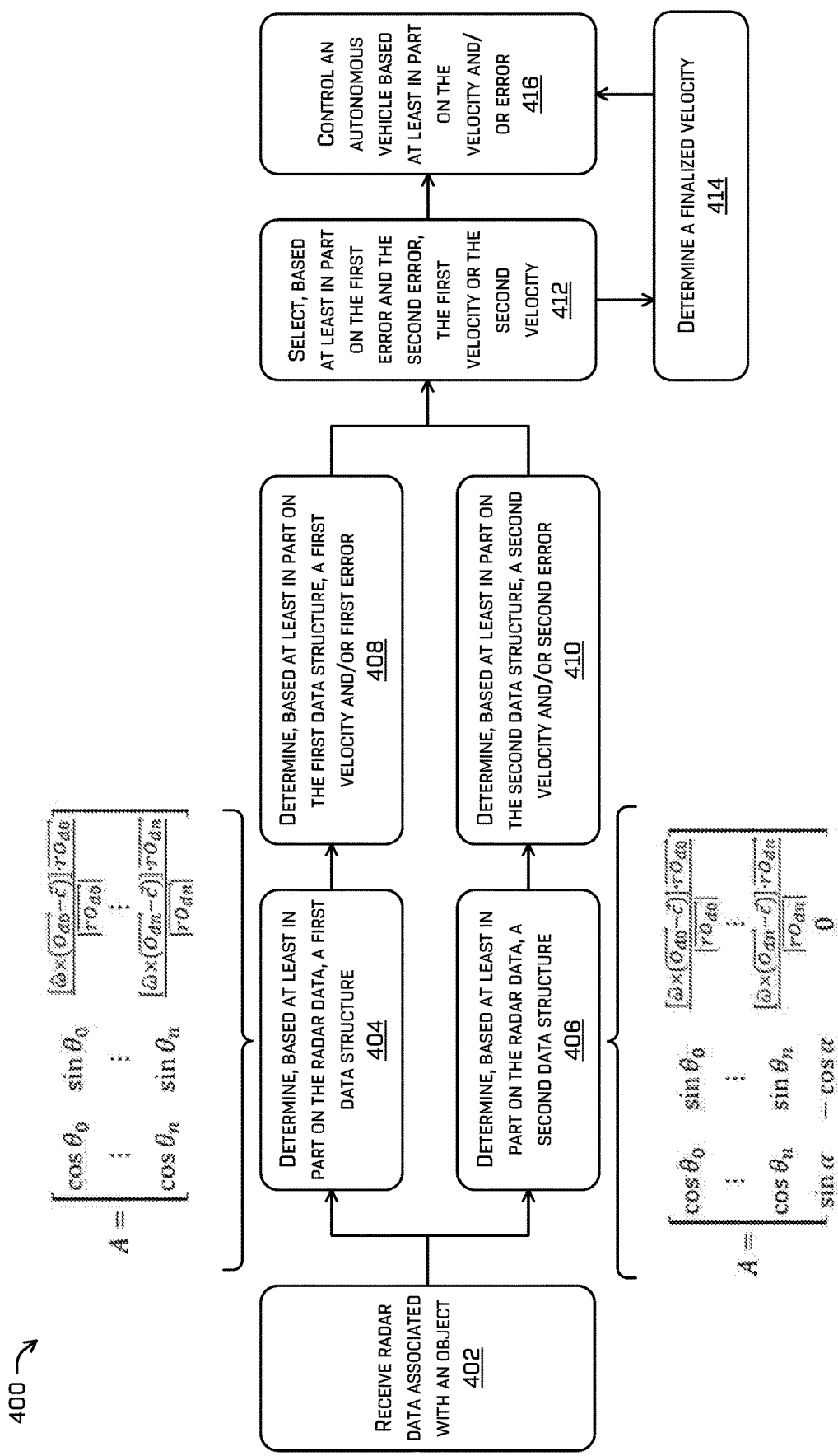
FIG. 4 illustrates a pictorial flow diagram of an example process for determining a two-or-more-dimensional velocity and/or yaw rate from radar data associated with an object.

The techniques discussed herein may comprise determining a two (or more)-dimensional velocity, such as the velocity depicted in FIG. 3, and/or a yaw rate, as discussed in more detail in FIG. 4.

FIG. 4 illustrates a pictorial flow diagram of an example process 400 for determining a two-or-more-dimensional velocity from radar data associated with an object based at least in part on a subset of radar data associated with the object. For example, the subset of radar data may be determined based at least in part on operations 306 and/or 312. Example process may additionally or alternatively determine a center and/or size/dimensions associated with the object.

At operation 402, example process 400 may comprise receiving radar data associated with an object, according to any of the techniques discussed herein. For example, the radar data may be a subset of n radar points determined at operation 306 and/or operation 312, where n is a positive integer. A point of the radar data, $d_0$ may include, for example, a position of the detected surface, Doppler velocity ($gdv_0$), a vector indicating a length and direction between the detection and the radar sensor, $\vec{rd_0}$; RCS, a rotation angle that may be determined based at least in part on the direction vector, $\theta_{d_n}$; and/or the like. Additionally or alternatively, the perception component may provide a track associated with the object to the radar component; the track may comprise a prior yaw, $\alpha$, and/or yaw rate; estimated center, c; position; and/or the like. In some examples, operation 402 may additionally or alternatively comprise running an outlier rejection algorithm to select further prune the radar data. For example, the outlier rejection algorithm may comprise a RANSAC algorithm, M-estimation, and/or the like.

At operation 404, example process 400 may comprise determining, based at least in part on the radar data and/or track, a first data structure, according to any of the techniques discussed herein. Operation 404 may comprise populating a data structure with data indicated by the n radar points. For example, the first data structure may comprise the following matrix:

$$A = \begin{bmatrix} \cos\theta_{d_0} & \sin\theta_{d_0} & \frac{[\hat{\omega} \times (\vec{d_0} - \vec{c})] \cdot \vec{rd_0}}{|\vec{rd_0}|} \\ \vdots & \vdots & \vdots \\ \cos\theta_{d_n} & \sin\theta_{d_n} & \frac{[\hat{\omega} \times (\vec{d_n} - \vec{c})] \cdot \vec{rd_n}}{|\vec{rd_n}|} \end{bmatrix} \quad (1)$$

where:

$$\hat{\omega} = 0\hat{i} + 0\hat{j} + \hat{k} \quad (2)$$

and $\theta_i$ may comprise the Doppler velocity (from the smooth rotation angle) of the i-th radar observation, $d_i$. Note that a row of the equation (1) may comprise a lateral contribution ($\cos\theta_{d_0}$), a longitudinal contribution ($\sin\theta_{d_0}$), and a yaw rate contribution $$\left( \frac{[\hat{\omega} \times (\vec{d_0} - \vec{c})] \cdot \vec{rd_0}}{|\vec{rd_0}|} \right)$$

of the two-or-more dimensional velocity to the ground return.

At operation 406, example process 400 may comprise determining, based at least in part on the radar data and/or track, a second data structure, according to any of the techniques discussed herein. Operation 404 may comprise populating a data structure with data indicated by the n radar points and track data associated with the object. For example, the first data structure may comprise the following matrix:

$$A = \begin{bmatrix} \cos\theta_{d_0} & \sin\theta_{d_0} & \frac{[\hat{\omega} \times (\vec{O_{d_0}} - \vec{c})] \cdot \vec{rd_0}}{|\vec{rd_0}|} \\ \vdots & \vdots & \vdots \\ \cos\theta_{d_n} & \sin\theta_{d_n} & \frac{[\hat{\omega} \times (\vec{O_{d_n}} - \vec{c})] \cdot \vec{rd_n}}{|\vec{rd_n}|} \\ \sin\alpha & -\cos\alpha & 0 \end{bmatrix} \quad (3)$$

The second data structure may be identical to the first data structure, but the second data structure may additionally comprise a yaw assumption, indicated by the last row of equation (3). In other words, the second data structure includes terms to impose an additional constraint on the yaw based on an assumed yaw. The corresponding "measurement" to be inserted into the subset of RADAR values is 0 such that the lateral velocity and longitudinal velocity are related via angle, alpha. The data structures indicated by equations (1) and (3) may be parameters of a linear or non-linear (e.g. least-squares) regression or robust regression algorithm. For example, the linear model that may form the basis of the linear regression or robust regression may be given as the following equation:

$$Ax = Y \quad (4)$$

where:

$$x = \begin{bmatrix} v_x \\ v_y \\ \omega \end{bmatrix} \quad (5)$$

$$Y = \begin{bmatrix} gdv_0 \\ \vdots \\ gdv_n \\ 0 \end{bmatrix} \quad (6)$$

Note that Y represents the observed radar values, which are the ground Doppler velocities in the given example and x represents the velocity components that the system is determining. Moreover, even though the equations and discussion above concern determining a velocity associated with the object, example process 400 may additionally or alternatively comprise determining a center and/or size/dimensions associated with the object. For example, the first and/or second data structure more comprise an assumption of the center and/or size/dimensions of the object, which may be based at least in part on a center and/or size/dimensions indicated by a previous track associated with the object. If the object has not been detected in a previous frame or the tracking operation has not been conducted yet, the center and/or size/dimensions may be initialized based at least in part on perception data, such as a classification, associated with the object or using a default initialization.

At operation 408, example process 400 may comprise determining a first velocity, first yaw rate, and/or first error, according to any of the techniques discussed herein. For example, the first error may be determined based at least in part on a residual determined by the expression Ax−Y. Operation 408 may comprise solving equation (4) based at least in part on the first data structure, given by equation (1).

At operation 410, example process 400 may comprise determining a second velocity, second yaw rate, and/or second error, according to any of the techniques discussed herein. Operation 410 may comprise solving equation (4) based at least in part on the first data structure, given by equation (3). Solving equation (4), for operation 408 and/or operation 410, may comprise a linear regression. The linear regression may determine an error associated with one or more of the radar points (e.g., rows of the matrix) and/or yaw assumption (e.g., last row of the second data structure. In some examples, the loss function may be part of the regression and the first error and/or the second error may be determined based at least in part on a total error that is based at least in part on an error determined by the regression algorithm. In some examples, the errors discussed herein may not be associated with a failure of the underlying sensor system, and may instead indicate a likelihood that the velocity associated therewith is correct. For example, the error may be a posterior probability.

In some examples, operation 408 and/or operation 410 may additionally or alternatively comprise determining a covariance associated with the first velocity and first yaw rate and/or the second velocity and second yaw rate, respectively. For example, the covariance associated with a velocity and yaw may be given by:

$$\text{cov}[x,x] = (A^T \text{cov}[Y,Y]^{-1} A)^{-1} \quad (7)$$

where:

$$\text{cov}[Y, Y] = \begin{bmatrix} \text{var}_0 & \cdots & \\ \vdots & \ddots & \\ & & \text{var}_n \end{bmatrix} \quad (8)$$

for equation (1), or $$\text{cov}[Y, Y] = \begin{bmatrix} \text{var}_0 & \cdots & & 0 \\ \vdots & \ddots & & \vdots \\ & & \text{var}_n & \\ 0 & & & \text{var}_{n+1} \end{bmatrix} \quad (9)$$

for equation (3).
where $\text{var}_n$ may be a static coefficient or, in an additional or alternate example, may be a variance, such as the range rate measured variance. In some examples, the value of $\text{var}_n$ may be set based at least in part on a detected environment of the vehicle. For example, if a perception component determines that the vehicle 304 is on a highway, the radar component may reduce the values of $\text{var}_n$ in comparison with detecting that the vehicle 304 is driving on a city center street.

At operation 412, example process 400 may comprise selecting, based at least in part on the first error and the second error, the first velocity and/or the first yaw rate or the second velocity and/or the second yaw rate, according to any of the techniques discussed herein. For example, the regression algorithm may determine a total error as part of determining the velocity during operation 408 and/or 410. Operation 412 may comprise selecting whichever velocity is associated with a lower error of the two errors. In some examples, one of the two data structures may cause a non-solvable or multi-solution equation, in which case operation 412 may comprise selecting the velocity associated with the solvable equation. For example, the matrix may be non-invertible, the error may numerically diverge during the regression, and/or the solution may violate a holonomic constraint. In some examples, the selected velocity may be associated with a track associated with the object.

At operation 414, example process 400 may comprise determining a finalized velocity, according to any of the techniques discussed herein. Determining the finalized velocity may be based at least in part on the selected velocity and/or the error. For example, the velocities determined at operations 408 and 410 (and the selected velocity) may be proposed or candidate velocities, and the velocity determined at operation 414 may be determined to a greater degree of accuracy in some examples. Operation 414 may be accomplished by a Bayesian filter (e.g., Kalman filter) and/or other estimation algorithm. In some examples, determining the velocity using one of the data structures may comprise determining the covariance, according to equation (7) and based on the data structure; determining an estimated velocity and/or estimated yaw rate using a regression algorithm based at least in part on equations (4)-(6); and determining a finalized velocity and/or estimated yaw rate using a Kalman filter. The Kalman filter may receive the covariance and estimated velocity and/or estimated yaw rate as input and determine the finalized velocity and/or estimated yaw rate based thereon. The Kalman filter may receive a noise signal associated with the radar data in addition or alternatively to the covariance. In some examples, the Kalman filter may receive a track associated with the object or at least a portion of the data associated therewith, such as a former position, velocity, yaw, yaw rate, and/or the like of the object. In some examples, operation 414 may be optional, additional, or alternative to operation 412.

At operation 416, example process 400 may comprise controlling an autonomous vehicle based at least in part on the velocity and/or the error, according to any of the techniques discussed herein. The velocity may be the selected velocity determined at operation 412 and/or the finalized velocity determined at operation 414. In some instances, operation 416 may additionally or alternatively be based at least in part on a yaw rate.

Figure 5:
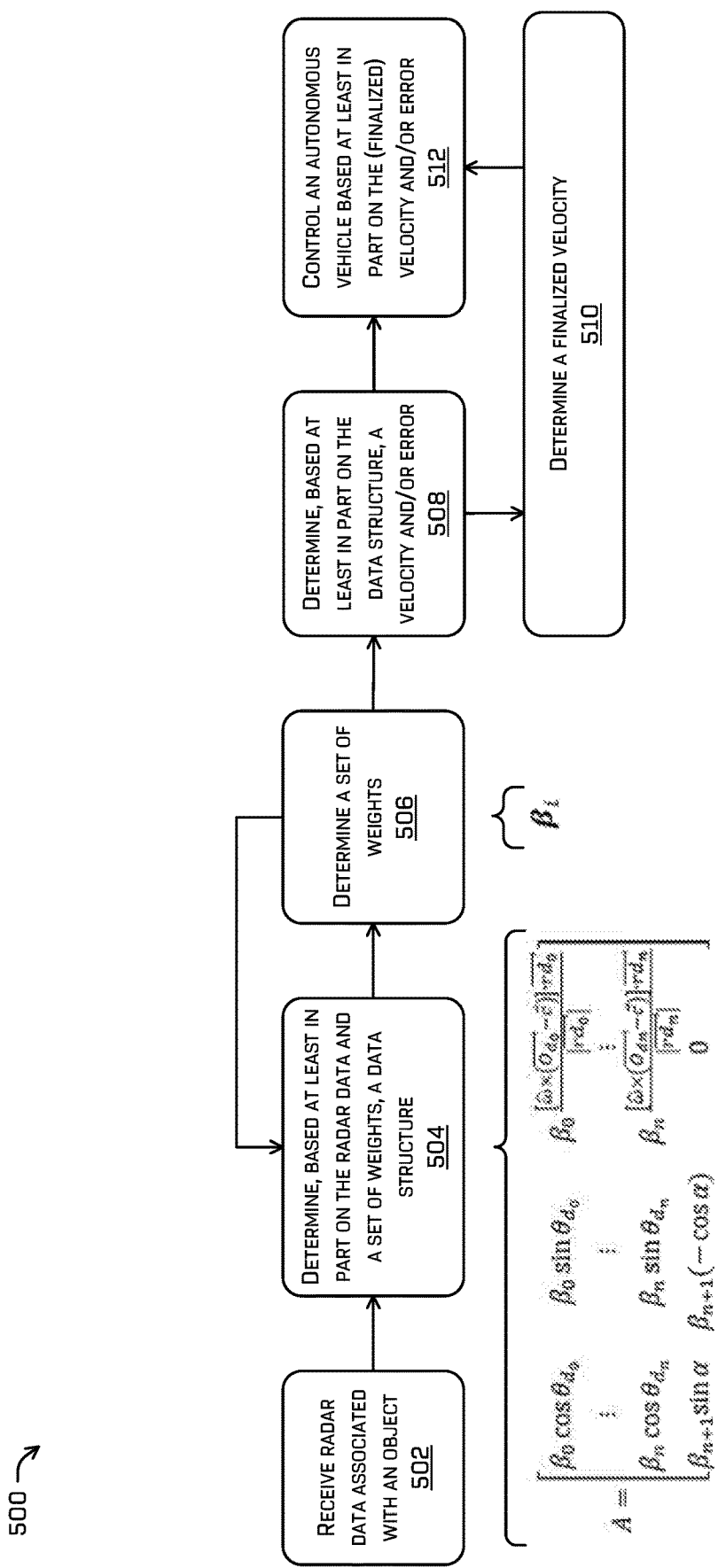
FIG. 5 illustrates a pictorial flow diagram of an example process for determining a two-or-more-dimensional velocity and/or yaw rate from radar data associated with an object.

FIG. 5 illustrates a pictorial flow diagram of an example process 500 for determining a two-or-more-dimensional velocity from radar data associated with an object based at least in part on a subset of radar data associated with the object. For example, the subset of radar data may be determined based at least in part on operations 306 and/or 312. In some examples, example process 500 may be deterministic by eliminating the use of RANSAC. Example process 500 may be faster than example process 400, in some instances, at least because example process 500 comprises solving one system whereas example process 400 may comprise solving two systems.

At operation 502, example process 500 may comprise receiving radar data associated with an object, according to any of the techniques discussed herein. For example, operation 502 may comprise operation 402.

At operation 504, example process 500 may comprise determining, based at least in part on the radar data and a set of weights, a data structure, according to any of the techniques discussed herein. Operation 506 may comprise populating a data structure with data indicated by the n radar points and track data associated with the object. For example, the data structure may comprise the following matrix:

$$A = \begin{bmatrix} \beta_n \cos\theta_{d_0} & \beta_n \sin\theta_{d_0} & \beta_0 \frac{[\hat{\omega} \times (\overrightarrow{O_{d_0}} - \vec{c})] \cdot \overrightarrow{rd_0}}{|\overrightarrow{rd_0}|} \\ \vdots & \vdots & \vdots \\ \beta_n \cos\theta_{d_n} & \beta_n \sin\theta_{d_n} & \beta_n \frac{[\hat{\omega} \times (\overrightarrow{O_{d_n}} - \vec{c})] \cdot \overrightarrow{rd_n}}{|\overrightarrow{rd_n}|} \\ \beta_{n+1} \sin\alpha & \beta_{n+1}(-\cos\alpha) & 0 \end{bmatrix} \quad (10)$$

where:

$$\hat{\omega} = 0\hat{i} + 0\hat{j} + \hat{k} \quad (2)$$

In some examples, the set of weights may comprise a different weight per row, $\beta_i$ (where i is the row/radar point number), although the weights may also be determined per column, $\beta_{i,j}$, where j ranges between the first and third column. Equation 9 is constructed according to the former example. The set of weights may function to maintain, increase, or decrease the influence of a row on the velocity determination at operation 508, which may correspond to a data point for the first n rows, in the velocity determination and/or the n+1-th weight corresponding to the last row of the matrix given above at (9) may function to turn on/off or increase or decrease the influence of the yaw assumption given by the last row of the matrix.

At operation 506, example process 500 may comprise determine a set of weights based at least in part on the radar data, according to any of the techniques discussed herein. Determining the set of weights, $\beta_i$ (where i is the row/radar point number), may comprise determining an error, e.g., a variance, associated with a radar point and determining a weight based at least in part on the error to minimize an overall error the subset of radar data associated with the object. For example, determining the set of weights may comprise a robust regression, such as an iteratively reweighted least squares algorithm. In a robust regression, a loss function may determine a residual associated with a radar detection and weight the radar detection based at least in part on the residual. For example, the loss function may be a Cauchy loss function, a Huber loss function, and/or the like. In such an example, the loss function may apply a smaller weight factor to the radar detection the larger the residual associated therewith. In some examples, the weighting process may comprise iteratively reweighting the radar detections until the weight sum converges, which may comprise iterating operations 504, 506, and/or 508. In some examples, the error determined at operation 506 may be determined based at least in part on a total error determined by the regression algorithm in association with the data structure. The set of weights may serve to replace determining two data structures and selecting between them and reduce solving two data structures to one.

In some examples, operation 506 may comprise populating the data structures with an assumption of the center and/or size/dimensions of the object based at least in part on a previous track or an initialization.

At operation 508, example process 500 may comprise determining, based at least in part on the data structure, a velocity and/or error, according to any of the techniques discussed herein. For example, determining the velocity and/or error may be part of the weighted linear regression discussed above. In some examples, a covariance may be determined in association with the velocity, such as by equations 7 and 9 given above. Operation 508 may additionally or alternatively comprise determining a center and/or size/dimensions associated with the object.

At operation 510, example process 500 may comprise determining a finalized velocity, according to any of the techniques discussed herein. Determining the finalized velocity may be based at least in part on the velocity and/or the covariance determined at operation 508. For example, the velocity determined at operation 508 may be a proposed or candidate velocity, and the velocity determined at operation 510 may be determined to a greater degree of accuracy in some examples. Operation 510 may be accomplished by a Bayesian filter (e.g., Kalman filter) and/or other estimation algorithm in some instances.

At operation 512, example process 500 may comprise controlling an autonomous vehicle based at least in part on the proposed and/or finalized velocity and/or error, according to any of the techniques discussed herein.

Example Clauses

A. A method comprising: receiving radar data associated with an object; determining, based at least in part on the radar data, a data structure comprising a first parameter portion and a second parameter portion, wherein the first parameter portion comprises: a lateral contribution to a velocity of the object, the lateral contribution being associated with a first radar observation, a longitudinal contribution associated with the first radar observation, a yaw rate contribution associated with the first radar observation; and wherein the second parameter portion comprises an assumption of a yaw rate associated with the object; determining a set of weights to apply to the data structure, the set of weights comprising at least a first weight associated with the first radar point and a second weight associated with the yaw rate contribution; determining, based at least in part on the data structure and the set of weights, a yaw rate associated with the object; and controlling an autonomous vehicle based at least in part on the yaw rate.

B. The method of paragraph A, wherein determining the velocity comprises determining a weighted regression based at least in part on the data structure and the set of weights.

C. The method of either paragraph A or B, further comprising: determining a velocity based at least in part on the data structure and the set of weights; providing the velocity and the yaw rate to a prediction system; and receiving a predicted trajectory of the object from the prediction system, wherein controlling the autonomous vehicle is further based at least in part on the predicted trajectory.

D. The method of any one of paragraphs A-C, further comprising receiving a track associated with the object, the track comprising at least one of a yaw or yaw rate associated with the object, wherein the yaw assumption is based at least in part on at least one of the yaw or yaw rate of the track.

E. The method of any one of paragraphs A-D, wherein determining the yaw rate comprises determining a proposed yaw rate and the method further comprises: determining a covariance based at least in part on the data structure; and determining, based at least in part on the covariance and the proposed yaw rate, a finalized yaw rate of the object, wherein controlling the vehicle is further based at least in part on the yaw rate and the covariance.

F. A system comprising: one or more processors; and a memory storing processor-executable instructions that, when executed by the one or more processors, cause the system to perform operations comprising: receiving radar data associated with an object; determining, based at least in part on the radar data, a data structure comprising a first parameter portion and a second parameter portion, wherein the second parameter portion comprises an assumption of a yaw rate associated with the object; determining a set of weights to apply to the data structure, the set of weights comprising at least a first weight associated with the first radar point and a second weight associated with the yaw rate contribution; determining, based at least in part on the data structure and the set of weights, a yaw rate associated with the object; and controlling an autonomous vehicle based at least in part on the yaw rate.

G. The system of paragraph F, wherein the operations further comprise: determining a velocity based at least in part on the data structure and the set of weights; providing the velocity and the yaw rate to a prediction system; and receiving a predicted trajectory of the object from the prediction system, wherein controlling the autonomous vehicle is further based at least in part on the predicted trajectory.

H. The system of either paragraph F or G, wherein the data structure comprises a radar observation comprising at least one of a Doppler observation associated with the object, a Doppler direction vector, or an angle associated with the vector.

I. The system of any one of paragraphs F-H, wherein the operations further comprise receiving a track associated with the object, the track comprising at least one of a yaw or yaw rate associated with the object, wherein the yaw assumption is based at least in part on at least one of the yaw or yaw rate of the track.

J. The system of any one of paragraphs F-I, wherein determining the yaw rate comprises determining a proposed yaw rate and the operations further comprise: determining a covariance based at least in part on the data structure; and determining, based at least in part on the covariance and the proposed yaw rate, a finalized yaw rate of the object, wherein controlling the vehicle is further based at least in part on the yaw rate and the covariance.

K. The system of any one of paragraphs F-J, wherein the operations further comprise: associating the velocity with a previously-generated track associated with the object, or generating a new track associated with the object and associating the velocity with the new track L. The system of any one of paragraphs F-K, wherein the operations further comprise at least one of determining a center or size of the object.

M. A non-transitory computer-readable medium storing processor-executable instructions that, when executed by one or more processors, cause the one or more processors to perform operations comprising: receiving radar data associated with an object; determining, based at least in part on the radar data, a data structure comprising a first parameter portion and a second parameter portion, wherein the second parameter portion comprises an assumption of a yaw rate associated with the object; determining a set of weights to apply to the data structure, the set of weights comprising at least a first weight associated with the first radar point and a second weight associated with the yaw rate contribution; determining, based at least in part on the data structure and the set of weights, a yaw rate associated with the object; and controlling an autonomous vehicle based at least in part on the yaw rate.

N. The non-transitory computer-readable medium of paragraph M, wherein the operations further comprise: determining a velocity based at least in part on the data structure and the set of weights; providing the velocity and the yaw rate to a prediction system; and receiving a predicted trajectory of the object from the prediction system, wherein controlling the autonomous vehicle is further based at least in part on the predicted trajectory.

O. The non-transitory computer-readable medium of either paragraph M or N, wherein the data structure comprises a radar observation comprising at least one of a Doppler observation associated with the object, a Doppler direction vector, or an angle associated with the vector.

P. The non-transitory computer-readable medium of any one of paragraphs M-O, wherein the operations further comprise receiving a track associated with the object, the track comprising at least one of a yaw or yaw rate associated with the object, wherein the yaw assumption is based at least in part on at least one of the yaw or yaw rate of the track.

Q. The non-transitory computer-readable medium of any one of paragraphs M-P, wherein determining the yaw rate comprises determining a proposed yaw rate and the operations further comprise: determining a covariance based at least in part on the data structure; and determining, based at least in part on the covariance and the proposed yaw rate, a finalized yaw rate of the object, wherein controlling the vehicle is further based at least in part on the yaw rate and the covariance.

R. The non-transitory computer-readable medium of any one of paragraphs M-Q, wherein the operations further comprise: associating the velocity with a previously-generated track associated with the object, or generating a new track associated with the object and associating the velocity with the new track S. The non-transitory computer-readable medium of any one of paragraphs M-R, wherein determining the first weight comprises: determining a residual based at least in part on the data structure and the yaw rate; and altering the first weight to reduce the residual.

T. The non-transitory computer-readable medium of any one of paragraphs M-S, wherein the operations further comprise at least one of determining a center or size of the object.

U. The method of any one of paragraphs A-T, wherein the data structure comprises a radar observation comprising at least one of a Doppler observation associated with the object, a Doppler direction vector, or an angle associated with the vector.

V. A method comprising: receiving radar data associated with an object; determining, based at least in part on the radar data, a first data structure comprising a first parameter portion; determining, based at least in part on the radar data, a second data structure comprising a second parameter portion, the second parameter portion comprising an assumption of a yaw associated with the object; determining, based at least in part on the first data structure, a first velocity associated with the object and a first error associated with the first velocity; determining, based at least in part on the second data structure, a second velocity associated with the object and a second error associated with the second velocity and the second yaw rate; and controlling an autonomous vehicle based at least in part on the first velocity and the first yaw rate or the second velocity and the second yaw rate based at least in part on the first error and the second error.

W. A system comprising: one or more processors; and a memory storing processor-executable instructions that, when executed by the one or more processors, cause the system to perform the method recited by any one of any one of claims A-E, U, or V.

X. A non-transitory computer-readable medium storing processor-executable instructions that, when executed by one or more processors, cause the one or more processors to perform the method recited by any one of claims A-E, U, or V.

While the example clauses described above are described with respect to one particular implementation, it should be understood that, in the context of this document, the content of the example clauses can also be implemented via a method, device, system, computer-readable medium, and/or another implementation. Additionally, any of examples A-X may be implemented alone or in combination with any other one or more of the examples A-X.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
  receiving radar data associated with an object;
  determining, based at least in part on the radar data, a data structure comprising a first parameter portion and a second parameter portion, wherein the first parameter portion comprises:
    a lateral contribution to a velocity of the object, the lateral contribution being associated with a first radar observation,
    a longitudinal contribution associated with the first radar observation,
    a yaw rate contribution associated with the first radar observation; and
    wherein the second parameter portion comprises an assumption of a yaw rate associated with the object;
  determining a set of weights to apply to the data structure, the set of weights comprising at least a first weight associated with the first radar observation and a second weight associated with the yaw rate contribution;

determining, based at least in part on the data structure and the set of weights, a final yaw rate associated with the object; and controlling an autonomous vehicle based at least in part on the final yaw rate.

2. The method of claim 1, wherein determining the velocity comprises determining a weighted regression based at least in part on the data structure and the set of weights.

3. The method of claim 1, further comprising:
determining a velocity based at least in part on the data structure and the set of weights;
providing the velocity and the final yaw rate to a prediction system; and
receiving a predicted trajectory of the object from the prediction system,
wherein controlling the autonomous vehicle is further based at least in part on the predicted trajectory.

4. The method of claim 1, further comprising receiving a track associated with the object, the track comprising at least one of a yaw or yaw rate associated with the object, wherein the yaw rate assumption is based at least in part on at least one of the yaw or yaw rate of the track.

5. The method of claim 1, wherein determining the final yaw rate comprises determining a proposed yaw rate and the method further comprises:
determining a covariance based at least in part on the data structure; and
determining, based at least in part on the covariance and the proposed yaw rate, the final yaw rate of the object,
wherein controlling the vehicle is further based at least in part on the final yaw rate and the covariance.

6. A system comprising:
one or more processors; and
a memory storing processor-executable instructions that, when executed by the one or more processors, cause the system to perform operations comprising:
receiving radar data associated with an object;
determining, based at least in part on the radar data, a data structure comprising a first parameter portion and a second parameter portion, wherein the second parameter portion comprises an assumption of a yaw rate associated with the object;
determining a set of weights to apply to the data structure, the set of weights comprising at least a first weight associated with a first radar observation and a second weight associated with a yaw rate contribution;
determining, based at least in part on the data structure and the set of weights, a final yaw rate associated with the object; and
controlling an autonomous vehicle based at least in part on the yaw rate.

7. The system of claim 6, wherein the operations further comprise:
determining a velocity based at least in part on the data structure and the set of weights;
providing the velocity and the final yaw rate to a prediction system; and
receiving a predicted trajectory of the object from the prediction system,
wherein controlling the autonomous vehicle is further based at least in part on the predicted trajectory.

8. The system of claim 6, wherein the data structure comprises a radar observation comprising at least one of a Doppler observation associated with the object, a Doppler direction vector, or an angle associated with the vector.

9. The system of claim 6, wherein the operations further comprise receiving a track associated with the object, the track comprising at least one of a yaw or yaw rate associated with the object, wherein the yaw rate assumption is based at least in part on at least one of the yaw or yaw rate of the track.

10. The system of claim 6, wherein determining the final yaw rate comprises determining a proposed yaw rate and the operations further comprise:
determining a covariance based at least in part on the data structure; and
determining, based at least in part on the covariance and the proposed yaw rate, the final yaw rate of the object,
wherein controlling the vehicle is further based at least in part on the final yaw rate and the covariance.

11. The system of claim 6, wherein the operations further comprise:
associating a velocity with a previously-generated track associated with the object, or
generating a new track associated with the object and associating the velocity with the new track.

12. The system of claim 6, wherein the operations further comprise at least one of determining a center or size of the object.

13. A non-transitory computer-readable medium storing processor-executable instructions that, when executed by one or more processors, cause the one or more processors to perform operations comprising:
receiving radar data associated with an object;
determining, based at least in part on the radar data, a data structure comprising a first parameter portion and a second parameter portion, wherein the second parameter portion comprises an assumption of a yaw rate associated with the object;
determining a set of weights to apply to the data structure, the set of weights comprising at least a first weight associated with a first radar observation and a second weight associated with a yaw rate contribution;
determining, based at least in part on the data structure and the set of weights, a final yaw rate associated with the object; and
controlling an autonomous vehicle based at least in part on the final yaw rate.

14. The non-transitory computer-readable medium of claim 13, wherein the operations further comprise:
determining a velocity based at least in part on the data structure and the set of weights;
providing the velocity and the final yaw rate to a prediction system; and
receiving a predicted trajectory of the object from the prediction system,
wherein controlling the autonomous vehicle is further based at least in part on the predicted trajectory.

15. The non-transitory computer-readable medium of claim 13, wherein the data structure comprises a radar observation comprising at least one of a Doppler observation associated with the object, a Doppler direction vector, or an angle associated with the vector.

16. The non-transitory computer-readable medium of claim 13, wherein the operations further comprise receiving a track associated with the object, the track comprising at least one of a yaw or yaw rate associated with the object, wherein the yaw rate assumption is based at least in part on at least one of the yaw or yaw rate of the track.

17. The non-transitory computer-readable medium of claim 13, wherein determining the final yaw rate comprises determining a proposed yaw rate and the operations further comprise:
  determining a covariance based at least in part on the data structure; and
  determining, based at least in part on the covariance and the proposed yaw rate, the final yaw rate of the object,
  wherein controlling the vehicle is further based at least in part on the final yaw rate and the covariance.

18. The non-transitory computer-readable medium of claim 13, wherein the operations further comprise:
  associating a velocity with a previously-generated track associated with the object, or
  generating a new track associated with the object and associating the velocity with the new track.

19. The non-transitory computer-readable medium of claim 13, wherein determining the first weight comprises:
  determining a residual based at least in part on the data structure and the yaw rate; and
  altering the first weight to reduce the residual.

20. The non-transitory computer-readable medium of claim 13, wherein the operations further comprise at least one of determining a center or size of the object.

* * * * *